US012706296B2

(12) United States Patent
Fei et al.

(10) Patent No.: US 12,706,296 B2
(45) **Date of Patent: *Aug. 11, 2026**

(54) PRELITHIATION DEVICE AND PRELITHIATION METHOD

(71) Applicant: CONTEMPORARY AMPEREX TECHNOLOGY (HONG KONG) LIMITED, Hong Kong (CN)

(72) Inventors: Xinlu Fei, Ningde (CN); Bin Xie, Ningde (CN); Fenggang Zhao, Ningde (CN); Shitong Chen, Ningde (CN); Yongqiang Xu, Ningde (CN); Tao Feng, Ningde (CN); Keqiang Li, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 541 days.

This patent is subject to a terminal disclaimer.

(21) Appl. No.: 18/220,301

(22) Filed: Jul. 11, 2023

(65) Prior Publication Data

US 2023/0352648 A1 Nov. 2, 2023

Related U.S. Application Data

(63) Continuation of application No. PCT/CN2022/098996, filed on Jun. 15, 2022.

(30) Foreign Application Priority Data

Jul. 30, 2021 (CN) ........................ 202110876169.3

(51) Int. Cl.
*H01M 4/04* (2006.01)
*H01M 4/38* (2006.01)

(52) U.S. Cl.
CPC ......... *H01M 4/0435* (2013.01); *H01M 4/382* (2013.01)

(58) Field of Classification Search
CPC .. H01M 4/0435; H01M 4/382; H01M 4/0404; B05C 1/08
See application file for complete search history.

(56) References Cited

U.S. PATENT DOCUMENTS

2016/0177210 A1* 6/2016 Leblanc ............. H01M 4/0435 72/236
2021/0210750 A1 7/2021 Chen et al.

FOREIGN PATENT DOCUMENTS

CN 205355146 U 6/2016
CN 207558931 U 6/2018
(Continued)

OTHER PUBLICATIONS

Machine translation of CN207558931U (Year: 2026).*
(Continued)

*Primary Examiner* — Maria Laios
*Assistant Examiner* — Ziheng Lu
(74) *Attorney, Agent, or Firm* — XSENSUS LLP

(57) ABSTRACT

A prelithiation device may comprise: a bonding structure comprising a first roller, a second roller and a third roller, which may be sequentially disposed adjacent to each other, the first roller and the second roller being used to roll the lithium ribbon, the rolled lithium ribbon adhering to the second roller, and the second roller and the third roller being used to bond the lithium ribbon adhering to the second roller to the substrate, the lithium ribbon comprising two first surfaces opposite each other in a width direction of the lithium ribbon and a second surface facing the second roller; and a coater disposed upstream of the bonding structure in a running direction of the lithium ribbon and configured to
(Continued)

simultaneously coat the second surface and at least one of the first surfaces with a release agent.

13 Claims, 6 Drawing Sheets

(56) References Cited

FOREIGN PATENT DOCUMENTS

| | | | |
|---|---|---|---|
| CN | 209929405 | U | 1/2020 |
| CN | 112310336 | A | 2/2021 |
| CN | 112838187 | A | 5/2021 |
| CN | 217158294 | U | 8/2022 |
| JP | 2018-130759 | A | 8/2018 |

OTHER PUBLICATIONS

Extended European Search Report issued Aug. 7, 2024 in European Patent Application No. 22848086.9.

Notification to Grant Patent Right for Invention issued Jul. 16, 2023 in Chinese Patent Application No. 202110876169.3 with English translation.

International Search Report and Written Opinion mailed on Sep. 7, 2022, received for PCT Application PCT/CN2022/098996, filed on Jun. 15, 2022, 10 pages including English Translation.

* cited by examiner

PRELITHIATION DEVICE AND PRELITHIATION METHOD

CROSS-REFERENCE TO RELATED APPLICATIONS

The present application is a continuation of International Application No. PCT/CN2022/098996, filed on Jun. 15, 2022, which claims the priority of Chinese patent application no. 202110876169.3, entitled "PRELITHIATION DEVICE AND PRELITHIATION METHOD" and filed on Jul. 30, 2021, each of which is incorporated herein by reference in its entirety.

TECHNICAL FIELD

The present application relates to the technical field of battery production equipment, and in particular to a prelithiation device and a prelithiation method.

BACKGROUND ART

At present, lithium-ion batteries are widely used in the fields of electric vehicles, consumer electronics, etc., because of their advantages such as high energy density and long service life. During the initial charge of a lithium-ion battery, some lithium will be consumed due to the formation of an SEI film (i.e., a solid electrolyte interface film), which will lead to the loss of lithium in a positive electrode material, reduce the battery capacity, and eventually reduce the efficiency of initial charge. In order to reduce the irreversible reduction of the battery capacity during the initial charge of the battery, in the industry, a prelithiation device is generally used to coat a surface of a substrate with lithium. Therefore, a prelithiation process is very important.

SUMMARY OF THE DISCLOSURE

An objective of the present application is to provide a prelithiation device and a prelithiation method. The prelithiation device can prevent a lithium ribbon from sticking to a roller to improve the production safety.

The present application is achieved by the following technical solutions.

In one aspect, the present application provides a prelithiation device for bonding a lithium ribbon to a substrate, the prelithiation device comprising: a bonding mechanism or structure comprising a first roller, a second roller and a third roller, which are sequentially disposed adjacent to each other, the first roller and the second roller being used to roll the lithium ribbon, with the rolled lithium ribbon adhering to the second roller, and the second roller and the third roller being used to bond the lithium ribbon adhering to the second roller to the substrate, the lithium ribbon comprising two first surfaces opposite each other in a width direction of the lithium ribbon and a second surface facing the second roller; and a coating mechanism or coater disposed upstream of the bonding mechanism in a running direction of the lithium ribbon and configured to simultaneously coat the second surface and at least one of the first surfaces with a release agent.

In the prelithiation device according to the embodiment of the present application, the second surface and the first surface of the lithium ribbon are simultaneously coated with the release agent by means of the coating mechanism, and the release agent on the second surface and the first surface is diffused as the lithium ribbon extends, so that the release agent is provided on the extended portions of the lithium ribbon, and when the lithium ribbon rotates with the second roller to be between the third roller and the second roller, the lithium ribbon can be separated from the second roller to bond to the substrate, thus preventing the lithium ribbon from sticking to the roller, thereby improving the production safety.

In another aspect, an embodiment of the present application further provides a prelithiation method for bonding a lithium ribbon to a substrate, the prelithiation method comprising: feeding the lithium ribbon between a first roller and a second roller to roll the lithium ribbon by means of the first roller and the second roller, with the rolled lithium ribbon adhering to the second roller, and the lithium ribbon comprising two first surfaces opposite each other in a width direction of the lithium ribbon and a second surface facing the second roller; feeding the substrate between the second roller and a third roller to bond the lithium ribbon adhering to the second roller to the substrate by means of the second roller and the third roller; and coating the second surface and at least one of the first surfaces with a release agent, by means of a coating mechanism, in a running direction of the lithium ribbon and upstream of the first roller and the second roller.

The prelithiation method according to the embodiment of the present application can implement coating of the first surface of the lithium ribbon with the release agent, and avoid the sticking of the lithium ribbon to the roller in a prelithiation process, thereby improving the prelithiation production safety.

Some of the additional aspects and advantages of the present application will be set forth in the following description, and some will become apparent from the following description, or be learned by practice of the present application.

BRIEF DESCRIPTION OF THE DRAWINGS

In order to more clearly describe the technical solutions of the embodiments of the present application, the accompanying drawings required in the embodiments will be described briefly below. It should be understood that the following accompanying drawings illustrate only some embodiments of the present application and therefore should not be construed as a limitation on the scope thereof. For those of ordinary skill in the art, other relevant accompanying drawings can also be obtained from these accompanying drawings without any creative effort.

FIG. 9 is a schematic diagram of a cleaning mechanism according to an embodiment of the present application;

FIG. 10 is another schematic diagram of a cleaning mechanism according to an embodiment of the present application.

Figure 1:
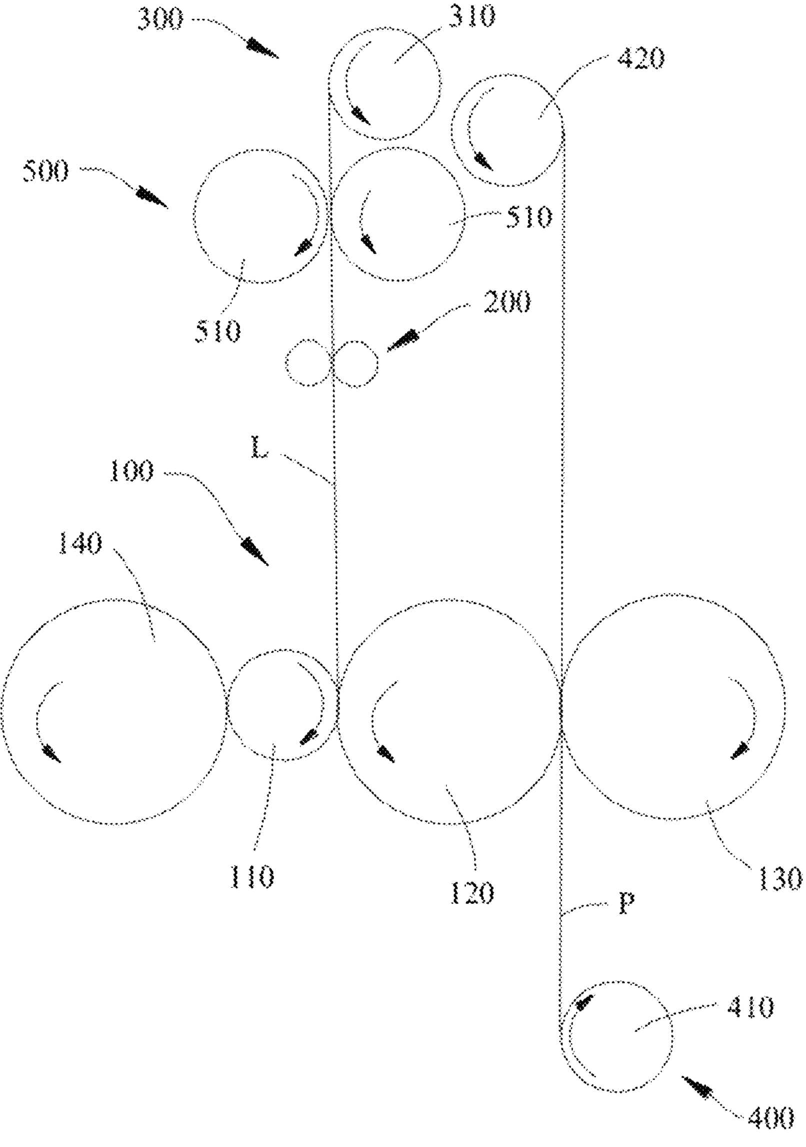
FIG. 1 is a schematic structural diagram of a prelithiation device provided according to an embodiment of the present application.

In the accompanying drawings, the figures are not drawn to scale.

List of reference numerals: 100—bonding mechanism; 110—first roller; 120—second roller; 130—third roller; 140—fourth roller; 200—coating mechanism; 210—coating roller; 211—recess; 2111—first side face; 2112—bottom face; α—included angle; 220—fixed roller; 221—boss; 222—notch; 223—fixed roller scraper; 230—support roller; 250—nozzle; 260—accommodating recess; 300—lithium ribbon conveying mechanism; 310—lithium ribbon unwinding roller; 400—substrate conveying mechanism; 410—substrate unwinding roller; 420—substrate winding roller; 500—prepressing mechanism; 510—prepressing roller; 610—traction roller; 620—traction belt; 700—cleaning mechanism; 710—cleaning scraper; 720—cleaning brush; 730—dust collection assembly; L—lithium ribbon; L1—first surface; L2—second surface; L3—third surface; and P—substrate.

DETAILED DESCRIPTION OF EMBODIMENTS

In order to make the objectives, technical solutions and advantages of embodiments of the present application clearer, the technical solutions in the embodiments of the present application will be described clearly and completely below with reference to the accompanying drawings in the embodiments of the present application. Obviously, the embodiments described are some of, rather than all of, the embodiments of the present application. Based on the embodiments of the present application, all other embodiments obtained by those of ordinary skill in the art without any creative effort fall within the scope of protection of the present application.

Unless otherwise defined, all technical and scientific terms used in the present application have the same meanings as those commonly understood by those skilled in the art to which the present application belongs; the terms used in the description of the present application are merely for the purpose of describing specific embodiments, but are not intended to limit the present application. The terms "comprising" and "having" and any variations thereof in the description and the claims of the present application as well as the brief description of the accompanying drawings described above are intended to cover non-exclusive inclusion. The terms "first", "second", etc. in the description and the claims of the present application as well as the foregoing accompanying drawings are used to distinguish between different objects, rather than describing a specific order or a primary-secondary relationship.

In the present application, "embodiment" mentioned means that the specific features, structures and characteristics described in conjunction with the embodiments may be included in at least one embodiment of the present application. The phrase at various locations in the description does not necessarily refer to the same embodiment, or an independent or alternative embodiment exclusive of another embodiment. Those skilled in the art should understand, in explicit and implicit manners, that an embodiment described in the present application may be combined with another embodiment.

In the description of the present application, it should be noted that, the terms "mount", "connected", "connect", or "attach" should be interpreted in a broad sense unless explicitly defined and limited otherwise. For example, they may be a fixed connection, a detachable connection, or an integral connection; or may be a direct connection, an indirect connection by means of an intermediate medium, or internal communication between two elements. For those of ordinary skills in the art, the specific meaning of the foregoing terms in the present application may be understood according to specific circumstances.

The term "and/or" in the present application is merely a description of the associated relationship of associated objects, representing that three relationships may exist, for example, A and/or B, may be expressed as: the three instances of A alone, A and B simultaneously, and B alone. In addition, the character "/" in the present application generally indicates that the associated objects before and after the character are in a relationship of "or".

In the present application, "a plurality of" means two or more (including two), and similarly, "a plurality of groups" means two or more groups (including two groups), and "a plurality of pieces" means two or more pieces (including two pieces).

A battery mentioned in the present application refers to a single physical module including one or more battery cells to provide a higher voltage and capacity. For example, the battery mentioned in the present application may comprise a battery module, a battery pack, etc.

The core member of a lithium-ion battery that can implement the repeated charge and discharge function is an electrode assembly in a battery cell. The electrode assembly comprises a positive electrode plate, a negative electrode plate, and a separator. The lithium-ion battery operates mainly by the movement of lithium ions between the positive electrode plate and the negative electrode plate.

The positive electrode plate comprises a positive electrode current collector and a positive electrode active material layer applied to a surface of the positive electrode current collector, and the current collector not coated with the positive electrode active material layer protrudes from the current collector coated with the positive electrode active material layer and serves as a positive electrode tab. Generally, in the lithium-ion battery, the positive electrode current collector may be aluminum foil, and the positive electrode active material layer may be ternary lithium, lithium manganate, lithium cobaltate or lithium iron phosphate, etc.

The negative electrode plate comprises a negative electrode current collector and a negative electrode active material layer applied to a surface of the negative electrode current collector, and the current collector not coated with the negative electrode active material layer protrudes from the current collector coated with the negative electrode active material layer and serves as a negative electrode tab. Generally, in the lithium-ion battery, the negative electrode current collector may be copper foil, and the negative electrode active material layer may be carbon or silicon, etc.

The lithium-ion battery forms a solid electrolyte interface film during the initial charge and discharge process, and the solid electrolyte interface film will consume some lithium, resulting in the loss of lithium and thus leading to a capacity loss of the lithium-ion battery. In order to compensate for the loss of active lithium during the initial charge and discharge process of the lithium-ion battery, it is desired to supplement active lithium onto the active material layer of the electrode plate in advance during forming of the electrode plate. At present, a prelithiation device is generally used to coat the surface of the electrode plate with lithium to reduce the irreversible decrease in capacity of the lithium-ion battery during the initial charge process and thus improve the capacity and cycle life of the lithium-ion battery.

The electrode plate prelithiation device may be used for prelithiation on the electrode plate to improve the capacity and cycle life of the lithium-ion battery. The substrate mentioned in the embodiments of the present application may be metal foil, i.e., a current collector, or may be an electrode plate provided with an active material layer.

A prelithiation process for the substrate mainly comprises a rolling process and a bonding process. In the rolling process, a lithium ribbon is thinned by pressing to form a lithium film; and in the bonding process, the lithium film is bonded to the surface of the substrate by rolling. It should be noted that for ease of subsequent description, the lithium film in the practical sense is also named after the lithium ribbon.

In the prior art, the prelithiation device rolls the lithium ribbon by means of a bonding mechanism and bonds the rolled lithium ribbon to the substrate, and potential safety hazards such as smoking and fire often occur during prelithiation.

The inventor has found that the main reason for smoking and fire is that the lithium ribbon sticks to a roller, and the sticking of the lithium ribbon to the roller is mainly due to the adhesion of an edge portion of the lithium ribbon to the roller. It has been found through further research that after the lithium ribbon is rolled, the lithium ribbon extends in a width direction, but since no release agent is provided on the lithium ribbon of the extended portions, the adhesive force between the lithium ribbon of the extended portions and the roller face of the roller is greater than that between the lithium ribbon and the substrate during bonding, so that the lithium ribbon of the extended portions still adhere to the roller face of the roller to cause sticking to the roller, resulting in potential safety hazards such as smoking and fire.

In view of this, the present application provides a prelithiation device comprising a bonding mechanism and a coating mechanism. The bonding mechanism comprises a first roller, a second roller and a third roller, which are sequentially disposed adjacent to each other, and the coating mechanism is disposed upstream of the bonding mechanism. A second surface of a lithium ribbon facing the second roller and at least one of first surfaces of the lithium ribbon in a width direction are simultaneously coated with a release agent by means of the coating mechanism, and the release agent on the second surface and the first surface is diffused as the lithium ribbon extends, so that the release agent is provided on the extended portions of the lithium ribbon; and when the lithium ribbon rotates with the second roller to locate between the third roller and the second roller, the lithium ribbon can be separated from the second roller and bonded to the substrate, thus preventing the lithium ribbon from sticking to the roller, thereby improving the production safety.

Figures 2, 3:
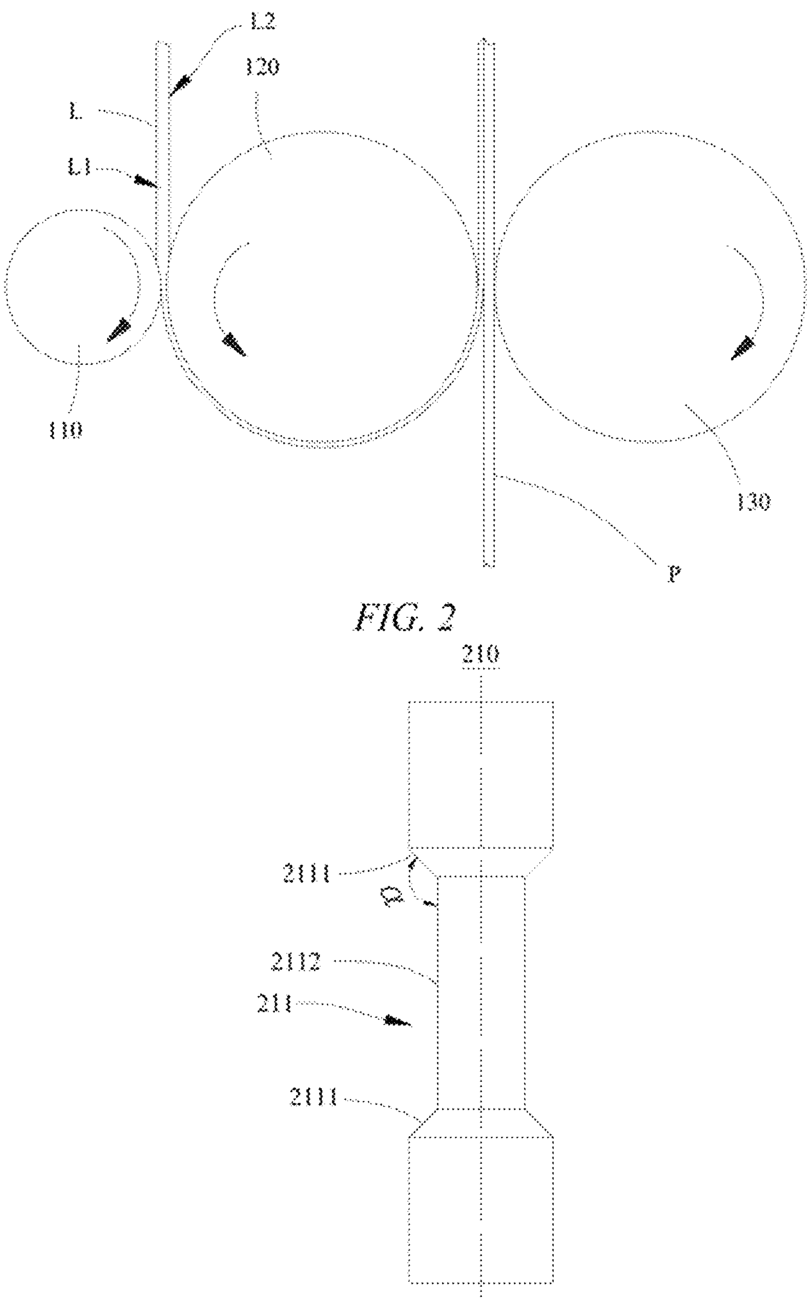
FIG. 2 is a schematic diagram of the principle of a prelithiation process provided according to an embodiment of the present application.
FIG. 3 shows a schematic structural diagram of a coating roller according to an embodiment of the present application.

FIG. 1 shows a schematic structural diagram of a prelithiation device according to an embodiment of the present application; and FIG. 2 shows a schematic diagram of the principle of a prelithiation process according to an embodiment of the present application. As shown in FIG. 1, the prelithiation device comprises a bonding mechanism 100 and a coating mechanism 200.

The bonding mechanism 100 comprising a first roller 110, a second roller 120 and a third roller 130, which are sequentially provided adjacent to each other. As shown in FIG. 2, the first roller 110 and the second roller 120 are used to roll a lithium ribbon L, and the rolled lithium ribbon L adheres to the second roller 120, so as to implement a rolling process. The second roller 120 and the third roller 130 are used to bond the lithium ribbon L adhering to the second roller 120 to a substrate P to implement a bonding process.

The first roller 110, the second roller 120 and the third roller 130 are parallel to each other, that is, have axes thereof parallel to each other.

The first roller 110 and the second roller 120 are disposed opposite each other, a roller gap between the first roller 110 and the second roller 120 is used for the lithium ribbon L to pass through, and the first roller 110 and the second roller 120 cooperate to achieve a rolling function. The second roller 120 and the third roller 130 are disposed opposite each other, a roller gap between the second roller 120 and the third roller 130 is used for the substrate P to pass through, and the second roller 120 and the third roller 130 cooperate to achieve a bonding function.

It should be noted that the arrangement of the first roller 110, the second roller 120 and the third roller 130 is not limited. For example, the first roller 110, the second roller 120 and the third roller 130 may be sequentially arranged in a horizontal direction, or the first roller 110, the second roller 120 and the third roller 130 may be sequentially arranged in a vertical direction, or the first roller 110, the second roller 120 and the third roller 130 may be arranged in an L-shape. The specific arrangement of the first roller 110, the second roller 120 and the third roller 130 can be determined according to the operating condition requirements matched for the prelithiation device. In this embodiment, the arrangement of the first roller 110, the second roller 120 and the third roller 130 is not limited. In this embodiment, only the example in which the first roller 110, the second roller 120 and the third roller 130 are sequentially arranged in the horizontal direction is taken as an example for description.

The lithium ribbon L comprises two first surfaces L1 (see FIG. 2) opposite each other in a width direction of the lithium ribbon L and a second surface L2 facing the second roller 120, the width direction of the lithium ribbon L being parallel to an axial direction of the second roller 120, i.e., the first surfaces L1 are narrow side faces of the lithium ribbon L.

The lithium ribbon L has certain plasticity. When the lithium ribbon L is fed between the first roller 110 and the second roller 120, since the roller gap between the first roller 110 and the second roller 120 is smaller than the thickness of the lithium ribbon L, the lithium ribbon is pressed to extend in the width direction and form a film-like structure with a certain thickness, which is conductive to bonding to the surface of the substrate P in a subsequent bonding process.

As shown in FIG. 1, the coating mechanism 200 is disposed upstream of the bonding mechanism 100 in a running direction of the lithium ribbon L, and the coating mechanism 200 is configured to simultaneously coat the second surface L2 and at least one of the first surfaces L1 with a release agent.

It should be noted that upstream and downstream are the sequence in the process for machining the lithium ribbon L, regardless of a spatial position. For example, the coating mechanism 200 being located upstream of the bonding mechanism 100 means that the lithium ribbon L is first coated with the release agent by the coating mechanism 200, then subjected to a rolling and bonding process by means of the bonding mechanism 100, and finally bonded to the substrate P.

In the prelithiation device according to the embodiment of the present application, as shown in FIG. 2, the second surface L2 and the first surface L1 are simultaneously coated with the release agent by means of the coating mechanism 200, and the release agent on the second surface L2 and the first surface L1 is diffused as the lithium ribbon L extends, so that the release agent is provided on extended portions of the lithium ribbon L, and when the lithium ribbon L rotates with the second roller 120 to be between the third roller 130 and the second roller 120, since the lithium ribbon L is coated with the release agent, the lithium ribbon L can be transferred from the second roller 120 and bonded to the substrate P, and the lithium ribbon L is not likely to adhere to the second roller 120, thus alleviating the problems such as smoking and fire caused by sticking of the lithium ribbon L to the roller, thereby improving the production safety.

It should be noted that the coating mechanism 200 may coat only one first surface L1 of the lithium ribbon L with the release agent, or may coat both the first surfaces L1 of the lithium ribbon L with the release agent. When the coating mechanism 200 coats only one first surface L1 of the lithium ribbon L with the release agent, in order to ensure that both the first surfaces L1 of the lithium ribbon L can be coated with the release agent, the prelithiation device is provided with a further coating mechanism, and the two coating mechanisms respectively coat the two first surfaces L1 of the lithium ribbon L in the width direction with the release agent. In order to ensure the uniform coating of the surface of the lithium ribbon L with the release agent, the coating mechanism 200 of the embodiment of the present application can simultaneously coat the second surface L2 and the two first surfaces L1 of the lithium ribbon L with the release agent.

Figure 4:
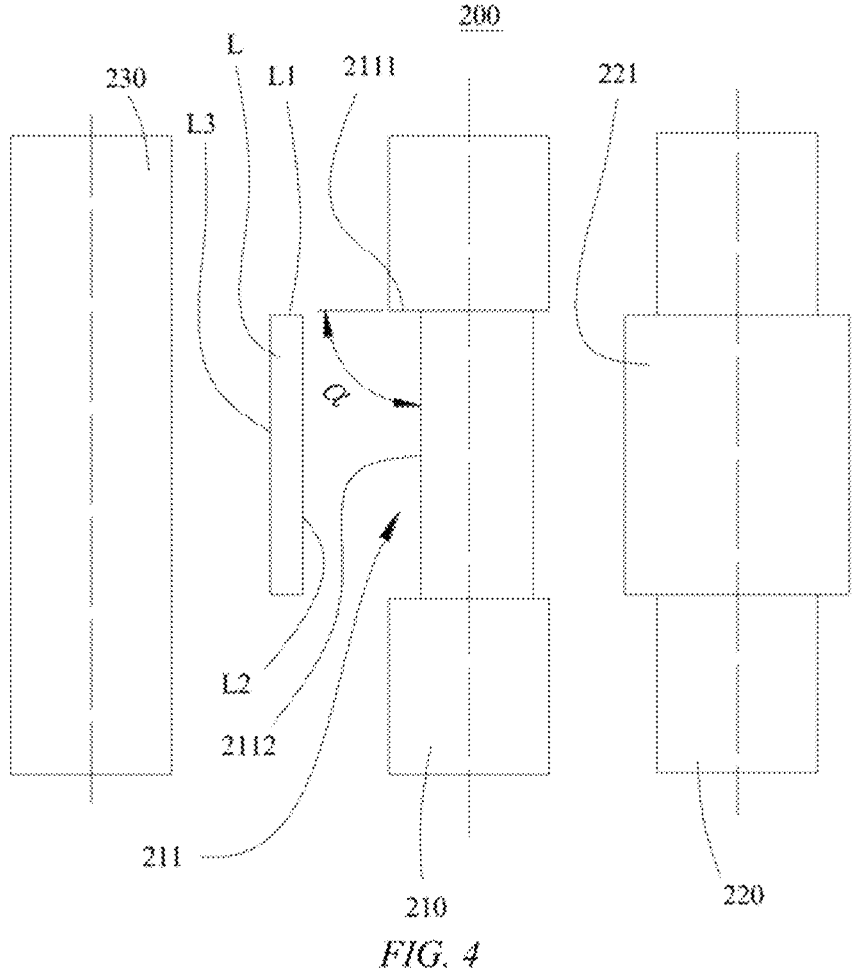
FIG. 4 shows a schematic structural diagram of a coating mechanism according to an embodiment of the present application.

FIG. 3 shows a schematic structural diagram of a coating roller 210 according to an embodiment of the present application; and FIG. 4 shows a schematic structural diagram of a coating mechanism 200 according to an embodiment of the present application.

According to some embodiments of the present application, as shown in FIGS. 3 and 4, the coating mechanism 200 comprises a coating roller 210, with a roller face of the coating roller 210 being provided with a recess 211 for accommodating the lithium ribbon L, the recess 211 being configured to simultaneously coat the second surface L2 and at least one of the first surfaces L1 with the release agent. Since the recess 211 can accommodate the lithium ribbon L, the recess 211 coats the lithium ribbon L with the release agent in such a manner that, when the lithium ribbon L passes through the recess 211, the release agent adhering to the recess face of the recess 211 adheres to both the first surface L1 and the second surface L2 of the lithium ribbon L.

According to some embodiments of the present application, the recess 211 is an annular recess disposed around the axis of the coating roller 210. When the coating roller 210 rotates, the first surface L1 and the second surface L2 of the lithium ribbon L are continuously coated with the release agent by means of the annular recess 211, thus improving coating efficiency.

According to some embodiments of the present application, as shown in FIGS. 3 and 4, the recess 211 comprises a bottom face 2112 and two first side faces 2111 opposite each other in an axial direction of the coating roller 210, the bottom face 2112 being configured to coat the second surface L with a release agent, and the two first side faces 2111 being configured to coat the two first surfaces L1 with a release agent. The bottom face 2112 and the two first side faces 2111 are both recess faces of the recess 211. The bottom face 2112 is connected to the two first side faces 2111 so as to accommodate the lithium ribbon L. When the bottom face 2112 and the first side faces 2111 are coated with the release agent, after the lithium ribbon L enters the recess 211, the release agent on the bottom face 2112 and the release agent on the first side faces 2111 can be simultaneously transferred to the second surface L2 and the first surfaces L1 of the lithium ribbon L, thus completing the simultaneous coating of the second surface L2 and the first surfaces L1 with the release agent. The second surface L2 and the two first surfaces L1 of the lithium ribbon L are simultaneously coated with the release agent by means of the bottom face 2112 and the two first side faces 2111, which can ensure the coating effect and achieve high coating efficiency.

In addition, the position of the lithium ribbon L is easily offset during running of the lithium ribbon L. When the lithium ribbon L cooperates with the recess 211, since the two first side faces 2111 correspond to the two first surfaces L1, the two first side faces 2111 can also achieve a limiting effect, thus ensuring that the first surfaces L1 and the second surface L2 of the lithium ribbon L can be coated with the release agent.

As shown in FIGS. 3 and 4, an included angle $\alpha$ is formed between each of the first side faces 2111 and the bottom face 2112.

For example, in some embodiments of the present application, the included angle $\alpha$ may be a right angle.

For another example, in some embodiments of the present application, as shown in FIG. 3, the included angle $\alpha$ may also be an obtuse angle. That is, the first side faces 2111 and the bottom face 2112 are disposed in an inclined manner. In this case, the first side faces 2111 have a large area, and thus the first surfaces L1 can be coated with more release agent, so as to ensure that sufficient release agent is provided on the extended portions of the lithium ribbon L after the lithium ribbon L is rolled.

Optionally, the included angle $\alpha$ is 135° to facilitate machining.

According to some embodiments of the present application, as shown in FIG. 4, the coating mechanism 200 further comprises a fixed roller 220, at least a part of the fixed roller 220 being inserted in the recess 211 and forming a gap with the recess 211, and the fixed roller 220 being used to control the thickness of the release agent adhering to the coating roller 210. The gap between the part of the fixed roller 220 inserted in the recess 211 and the recess 211 means that the contour of structure of the part of the fixed roller 220 matches the contour of the recess 221, and the part of the fixed roller 220 is inserted in the recess 211 and forms a gap with the recess face of the recess 211, the gap allowing the release agent to pass through. The thickness of the release agent adhering to the coating roller 210 can be controlled by means of controlling the width of the gap between the fixed roller 220 and the recess 211. That is, the fixed roller 220 is fixedly disposed, the coating roller 210 is rotatably disposed, and the coating roller 210 can rotate relative to the fixed roller 220. The cooperation of the fixed roller 220 and the recess 211 can control the thickness of the release agent on the coating roller 210 to ensure that the thickness of the release agent adhering to the surface of the lithium ribbon L is consistent.

Specifically, after the lithium ribbon L enters the recess 211, since the gap between the fixed roller 220 and the coating roller 210 is fixed, the fixed roller 220 scrapes off the extra-thick part of the release agent on the coating roller 210 through rotation of the coating roller 210, so that the thickness of the release agent on the coating roller 210 is approximately equal to the width of the gap, and thus the thickness of the release agent on the coating roller 210 is consistent. When the coating roller 210 cooperates with the lithium ribbon L, the release agent on the coating roller 210 is transferred to the first surface L1 of the lithium ribbon L, thereby completing the coating of the first surface L1 with the release agent. The uniform thickness of the release agent on the coating roller 210 can alleviate the problem of uneven coating due to the uneven supply of the release agent by the coating roller 210, so that the thickness of the release agent on the first surface L1 is consistent.

According to some embodiments of the present application, as shown in FIG. 4, a roller face of the fixed roller 220 is provided with a boss 221, the boss 221 being inserted in the recess 211 and forms a gap with the recess 211. That is, the contour of the boss 221 matches the contour of the recess 211, and the value of depth of the boss 221 inserted into the recess 211 determines the size of the gap between the boss 221 and the recess 211, so that the adjustment of the depth of the boss 221 inserted into the recess 211 can change the gap between the boss 221 and the recess 211 and then control the thickness of the release agent on the coating roller 210. The thickness of the release agent adhering to the coating roller 210 is controlled by means of the gap between the boss 221 and the recess 211, achieving a simple structure and convenient operation.

According to some embodiments of the present application, the boss 221 is an annular boss disposed around the axis of the fixed roller 220 to facilitate machining.

Figure 5:
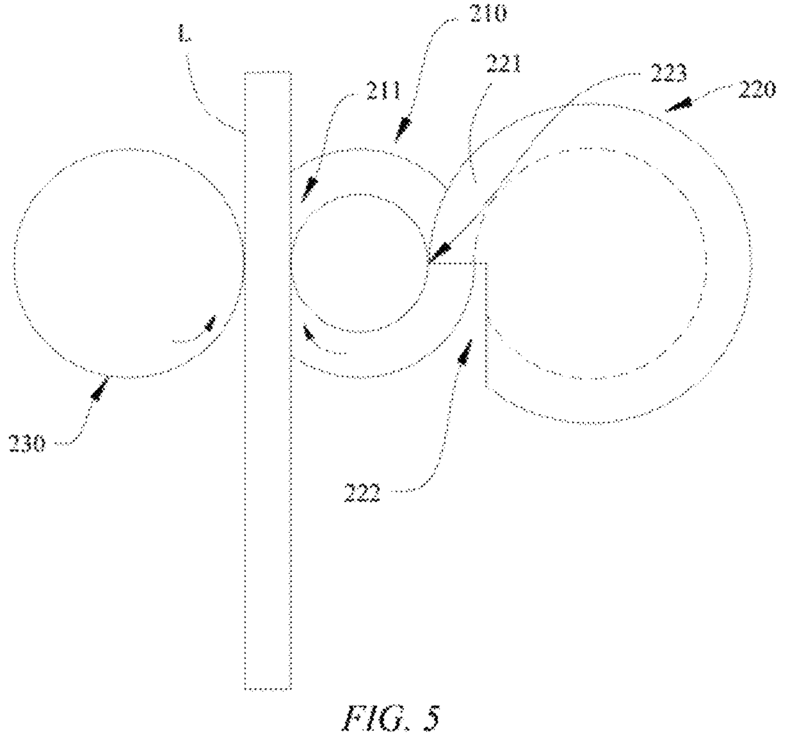
FIG. 5 is a schematic diagram of a coating mechanism in an operating state according to an embodiment of the present application.

FIG. 5 shows a schematic diagram of the operating state of a coating mechanism 200 according to an embodiment of the present application. According to some other embodiments of the present application, as shown in FIG. 5, the boss 221 is disposed around the axis of the fixed roller 220, and the boss 221 has a notch 222 in a circumferential direction of the fixed roller 220. In other words, on the basis of the boss 221 of an annular structure, the notch 222 is formed in the boss 221 to control the thickness of the release agent on the coating roller 210. Specifically, in the circumferential direction of the fixed roller 220, the notch 222 cuts off the annular boss 221. In addition, the notch 222 penetrates the boss 221 in the axial direction of the fixed roller 220, so that a fixed roller scraper 223 is formed at an edge of the notch 222 of the boss 221 close to the recess 211. The fixed roller scraper 223 matches the contour of the recess 211, and the thickness of the release agent adhering to the recess face of the recess 211 is determined by means of a gap between the fixed roller scraper 223 and the recess 211, thereby controlling the thickness of the release agent on the coating roller 210.

During the operation of the coating roller 210, in the direction of rotation around the coating roller 210, the coating roller 210 first passes across the fixed roller 220 and cooperates with the fixed roller 220 to control the thickness of the release agent on the coating roller 210, and then the coating roller 210 coats the second surface L2 and the first surface L1 of the lithium ribbon L with the release agent.

According to some embodiments of the present application, the fixed roller 220 is located on the side of the coating roller 210 that is away from the lithium ribbon L. That is, the fixed roller 220 and the lithium ribbon L are disposed at 1800 in the direction of rotation of the coating roller 210. This arrangement achieves rational utilization of the installation space to avoid affecting the running of the lithium ribbon L.

It should be noted that the position of the fixed roller 220 may be determined according to the actual prelithiation condition. When it is ensured that the running of the lithium ribbon L is not affected and no interference with another component occurs, the fixed roller 220 may be disposed at any position in the direction of rotation of the coating roller 210, provided that it can be ensured that the thickness of the release agent on the coating roller 210 is consistent.

According to some embodiments of the present application, the coating mechanism 200 may further comprise a release agent squeezing mechanism (not shown) that is used to squeeze the release agent between the coating roller 210 and the fixed roller 220. For example, a storage apparatus is connected by means of a conduit, and the release agent is squeezed between the coating roller 210 and the fixed roller 220 through the conduit by means of a pumping mechanism.

According to some embodiments of the present application, as shown in FIGS. 4 and 5, the coating mechanism 200 further comprises a support roller 230, and the lithium ribbon L passes between the support roller 230 and the coating roller 210. That is, the support roller 230 comes into contact with a third surface L3 of the lithium ribbon L on the side away from the second roller 120 (see FIG. 1), and supports the third surface L3 (see FIG. 4). The lithium ribbon L will shake during running of the lithium ribbon L. The lithium ribbon L is limited between the support roller 230 and the coating roller 210 by means of the cooperation of the support roller 230 and the coating roller 210, so as to ensure that the first surface L1 and the second surface L2 of the lithium ribbon L can be simultaneously coated with the release agent and ensure that the release agent adhering to the surface of the lithium ribbon L is uniform. For example, as shown in FIG. 5, the support roller 230 is disposed in parallel with the coating roller 210, the size of the recess 211 of the coating roller 210 is slightly greater than that of the lithium ribbon L, the roller face of the support roller 230 adheres to the roller face of the coating roller 210, the support roller 230 presses the lithium ribbon L into the recess 211 of the coating roller 210, and the contact stress between the support roller 230 and the lithium ribbon L is stable, which ensures that the gap between the lithium ribbon L and the recess 211 is fixed and then ensures that the release agent coating on the surface of the lithium ribbon L is uniform.

It should be noted that the axial dimension of the support roller 230 is greater than the dimension of the recess 211 of the coating roller 210 in the axial direction of the coating roller 210. In addition, when the support roller 230 cooperates with the coating roller 210, the projection of the recess 211 is located in the projection of the support roller 230 in a thickness direction of the lithium ribbon L.

In addition, since the support roller 230 presses the lithium ribbon L into the recess 211, the two first side faces 2111 of the recess 211 can limit the movement of the lithium ribbon L in the width direction, thereby achieving a limiting effect.

When the support roller 230 cooperates with the coating roller 210, the support roller 230 presses the lithium ribbon L into the recess 211, and as the coating roller 210 rotates, the second surface L2 and the two first surfaces L1 of the lithium ribbon L can be simultaneously coated with the release agent by means of the recess 211, thereby ensuring the uniformity of the release agent adhering to the surface of the lithium ribbon L to ensure the coating effect.

Figure 6:
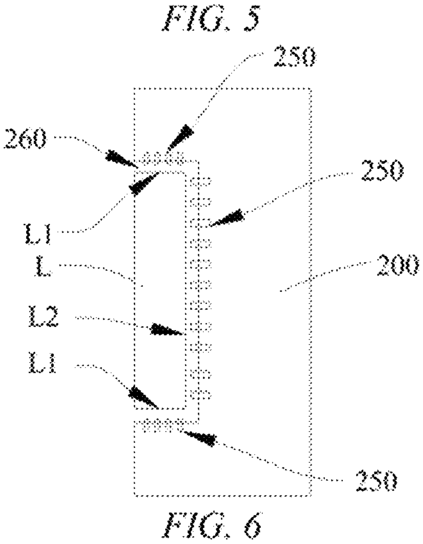
FIG. 6 is a schematic structural diagram of a coating mechanism according to another embodiment of the present application.
Figures 7, 8:
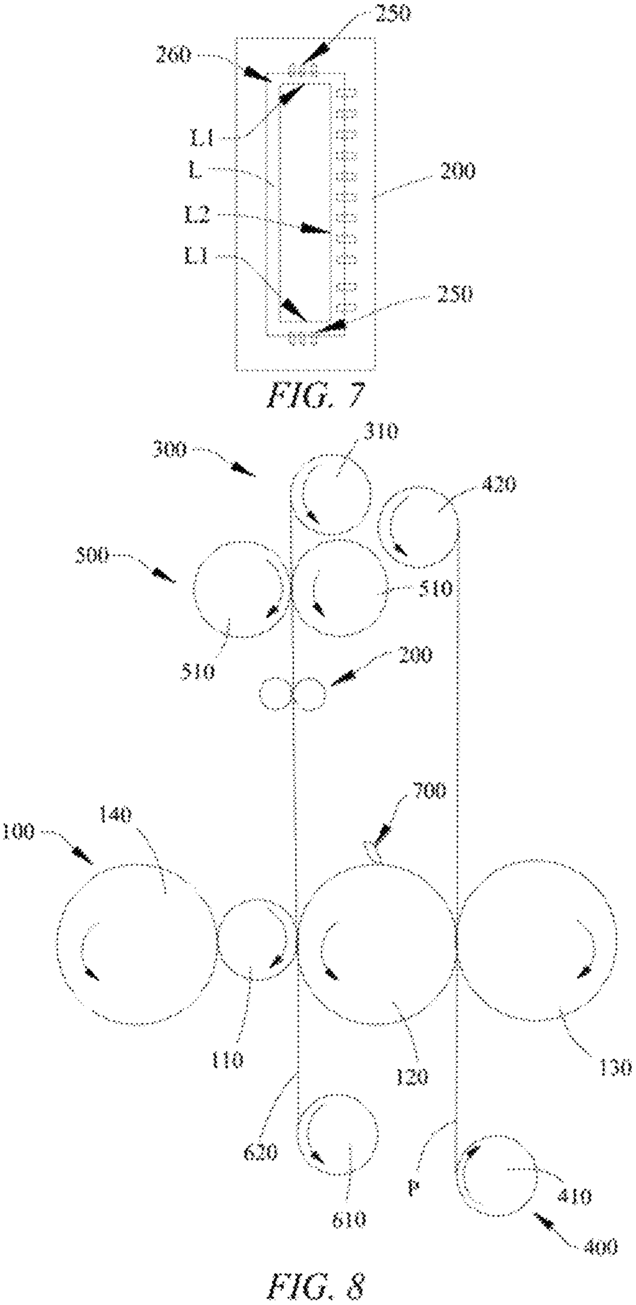
FIG. 7 is a schematic structural diagram of a coating mechanism according to still another embodiment of the present application.
FIG. 8 is a schematic diagram of a prelithiation device during prelithiation according to an embodiment of the present application.

FIG. 6 shows a schematic structural diagram of a coating mechanism 200 according to another embodiment of the present application; and FIG. 7 shows a schematic structural diagram of a coating mechanism 200 according to still another embodiment of the present application. With regard to the coating mechanism 200, in addition to the above method of transferring and coating the release agent by means of the coating roller 210, according to some other embodiments of the present application, the coating mechanism 200 may also be a spray-coating mechanism. That is, as shown in FIGS. 6 and 7, the coating mechanism 200 comprises a nozzle 250, and the nozzle 250 is configured to simultaneously coat the second surface L2 and the first surface L1 of the lithium ribbon L with the release agent. The coating mechanism 200 is provided with an accommodating recess 260 for accommodating the lithium ribbon L. The accommodating recess 260 can accommodate at least the second surface L2 and the two first surfaces L1 of the lithium ribbon L. For example, as shown in FIG. 6, the accommodating recess 260 can accommodate the second surface L2 and the two first surfaces L1 of the lithium ribbon L. For another example, as shown in FIG. 7, the accommodating recess 260 can accommodate all surfaces of the lithium ribbon L including the second surface L2 and the two first surfaces L1, that is, the accommodating recess 260 is an annular recess, and the lithium ribbon L passes through the accommodating recess 260. It should be noted that FIGS. 6 and 7 are only schematic diagrams of the arrangement of the nozzle 250 of the coating mechanism 200, and other components are not disclosed.

FIG. 8 shows a schematic diagram of a prelithiation device during prelithiation according to an embodiment of the present application.

Generally, as shown in FIG. 8, the prelithiation device further comprises a lithium ribbon conveying mechanism 300 and a substrate conveying mechanism 400, the lithium ribbon conveying mechanism 300 being used to feed the lithium ribbon L between the first roller 110 and the second roller 120, and the substrate conveying mechanism 400 being used to feed the substrate P between the second roller 120 and the third roller 130.

The lithium ribbon conveying mechanism 300 comprises a lithium ribbon unwinding roller 310. The lithium ribbon unwinding roller 310 is configured to arrange the lithium ribbon L. For example, the lithium ribbon L may be disposed on the lithium ribbon unwinding roller 310 in a winding manner, and the lithium ribbon L is fed between the first roller 110 and the second roller 120 through rotation of the lithium ribbon unwinding roller 310. The substrate conveying mechanism 400 comprises a substrate unwinding roller 410 and a substrate winding roller 420. The substrate unwinding roller 410 and the substrate winding roller 420 are used to arrange the substrate P. For example, the substrate P may be disposed on the substrate unwinding roller 410 and the substrate winding roller 420 in a winding manner.

While the lithium ribbon L is fed between the second roller 120 and the third roller 130, since the substrate conveying mechanism 400 feeds the substrate P between the second roller 120 and the third roller 130, the lithium ribbon L and the substrate P are simultaneously located in a roller gap between the second roller 120 and the third roller 130. Compared with the roller face of the second roller 120, the substrate P has a larger surface roughness, and the adhesive force between the lithium ribbon L and the substrate P is greater than that between the lithium ribbon L and the second roller 120. When the lithium ribbon L comes into contact with the substrate P and is rolled, the lithium ribbon L adheres to the substrate P, and as the substrate P is conveyed, the substrate P pulls the lithium ribbon L, so that the lithium ribbon L is peeled off from the roller face of the second roller 120, thereby coating the substrate P with lithium, that is, completing a prelithiation process for the substrate P.

To improve applicability of the bonding mechanism 100, the prelithiation device further comprises a roller gap adjustment mechanism (not shown) for adjusting the roller gap between the first roller 110 and the second roller 120 and adjusting the roller gap between the second roller 120 and the third roller 130, so as to regulate the rolling effect and the bonding effect of the bonding mechanism 100 and then adapt to different prelithiation requirements.

According to some embodiments of the present application, as shown in FIG. 8, the prelithiation device further comprises a prepressing mechanism 500. The prepressing mechanism 500 is disposed upstream of the coating mechanism 200 in the running direction of the lithium ribbon L, and the prepressing mechanism 500 is used to prepress the lithium ribbon L to improve the thickness consistency of the lithium ribbon L, so as to significantly improve the effect of coating the surface of the lithium ribbon L with the release agent. The thickness consistency of the lithium ribbon L is associated with manufacturing costs, and reducing the requirement for the thickness consistency of the lithium ribbon L can reduce the cost of incoming material of the lithium ribbon L. As shown in FIG. 8, the prepressing mechanism 500 comprises two prepressing rollers 510, and the lithium ribbon L first passes between the two prepressing rollers 510 and then passes across the coating mechanism 200.

Under the rolling action of the prepressing mechanism 500, the amount of compression of the lithium ribbon L is 10% to 20%. Since the lithium ribbon L has a small amount of compression and does not easily adhere to the prepressing rollers 510, the two prepressing rollers 510 may be disposed upstream of the coating mechanism 200.

According to some embodiments of the present application, the roller diameter of the first roller 110 is less than that of the second roller 120. Different-diameter rolling can be implemented by configuration of large and small roller diameters. Compared with same-diameter rolling, the different-diameter rolling increases the contact area between the second roller 120 and the lithium ribbon L, and improves the engagement between the lithium ribbon L and the first roller 110 and the engagement between the lithium ribbon L and the second roller 120, so that the lithium ribbon L more easily adheres to the roller face of the second roller 120.

Since the first roller 110 has a small roller diameter, the first roller 110 is easily deformed during rolling, which reduces the thickness consistency of rolling. According to some embodiments of the present application, the bonding mechanism 100 further comprises a fourth roller 140. The fourth roller 140 is disposed opposite the first roller 110 and is located on the side of the first roller 110 that is away from the second roller 120. The fourth roller 140 has a roller diameter greater than that of the first roller 110. The fourth roller 140 and the first roller 110 come into contact with each other and rotate relative to each other, which can reduce the deformation of the first roller 110 during long-term use, improve the thickness consistency of the lithium ribbon L during rolling, and prolong the service life of the device.

According to some embodiments of the present application, as shown in FIG. 8, the prelithiation device further comprises a traction roller 610 and a traction belt 620, the traction belt 620 being connected to the traction roller 610, and the traction roller 610 being disposed downstream of the first roller 110 in the running direction of the lithium ribbon L. The traction roller 610 is a driving roller. When the lithium ribbon L needs to be pulled to run, the traction belt 620 may be connected to the lithium ribbon L, and then the lithium ribbon L is driven through rotation of the traction roller 610 to run. When the lithium ribbon L follows the traction belt 620 to enter between the first roller 110 and the second roller 120, since the roller gap between the first roller 110 and the second roller 120 is smaller than the thickness of the lithium ribbon L, the thinned lithium ribbon L is separated from the traction belt 620 under the action of rolling pressure, and the lithium ribbon L adheres to the roller face of the second roller 120.

If the traction roller 610 and the traction belt 620 are not provided, the lithium ribbon L needs to be manually pulled between the first roller 110 and the second roller 120, and the lithium ribbon L is pulled by the first roller 110 and the second roller 120 to run. In this way, the coating mechanism 200 cannot coat an initial section of the lithium ribbon L with the release agent, so that the initial section of the lithium ribbon L will adhere to the surface of the first roller 110 or the second roller 120. In this case, the initial section of the lithium ribbon L cannot be transferred to the surface of the substrate P, resulting in a waste of the lithium ribbon L and also reducing the flatness of the roller faces of the first roller 110 and the second roller 120 to affect the subsequent rolling of the lithium ribbon L.

After the lithium ribbon L is bonded to the substrate P, lithium filings and the release agent will remain on the roller face of the second roller 120. In order to avoid affecting the rolling and bonding of the lithium ribbon L, it is necessary to remove the residue on the second roller 120 in a timely manner.

As shown in FIG. 8, the prelithiation device further comprises a cleaning mechanism 700. The cleaning mechanism 700 is used to clean the roller face of the second roller 120. FIG. 9 shows a schematic diagram of the cleaning mechanism 700 according to an embodiment of the present application; and FIG. 10 shows another schematic diagram of the cleaning mechanism 700 according to an embodiment of the present application. As shown in FIGS. 9 and 10, the cleaning mechanism 700 comprises a cleaning scraper 710, a cleaning brush 720, and a dust collection assembly 730, the cleaning scraper 710 abutting against the roller face of the second roller 120, the cleaning brush 720 being in contact with the roller face of the second roller 120, and the dust collection assembly 730 being used to remove the lithium filings and release agent scraped off by the cleaning scraper 710. As the second roller 120 rotates, the cleaning scraper 710 scrapes off the residual lithium filings and release agent on the roller face of the second roller 120. The cleaning brush 720 is located downstream of the cleaning scraper 710, and is used to further clean the roller face of the second roller 120. The dust collection assembly 730 may be disposed on a side of the cleaning scraper 710, so as to remove the scraped lithium filings and release agent under the action of negative pressure.

Figure 11:
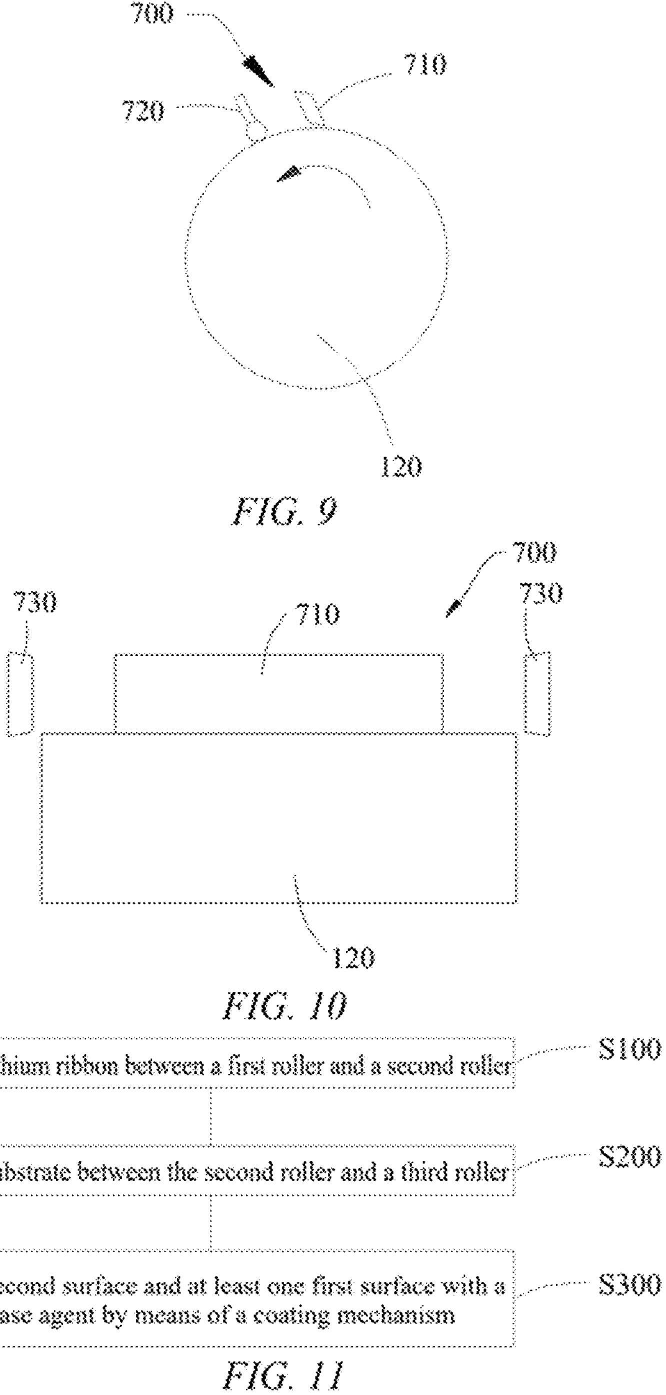
FIG. 11 is a schematic flowchart of a prelithiation method according to an embodiment of the present application.

A prelithiation method provided according to an embodiment of the present application will be described below, and the prelithiation method is implemented using the prelithiation device mentioned above. FIG. 11 shows a schematic flowchart of a prelithiation method according to an embodiment of the present application. As shown in FIG. 11, the prelithiation method comprises:

S100, feeding a lithium ribbon L between a first roller 110 and a second roller 120 to roll the lithium ribbon L by means of the first roller 110 and the second roller 120, with the rolled lithium ribbon L adhering to the second roller 120, and the lithium ribbon L comprising two first surfaces L1 opposite each other in a width direction of the lithium ribbon L and a second surface L2 facing the second roller 120;

S200, feeding a substrate P between the second roller 120 and a third roller 130 to bond the lithium ribbon L adhering to the second roller 120 to the substrate P by means of the second roller 120 and the third roller 130; and S300, simultaneously coating the second surface L2 and at least one of the first surfaces L1 with a release agent, by means of a coating mechanism 200, in a running direction of the lithium ribbon L and upstream of the first roller 110 and the second roller 120.

In the prelithiation method according to the embodiment of the present application, before the lithium ribbon L is rolled, the first surface L1 of the lithium ribbon L in the width direction is coated with the release agent, so that sufficient release agent is provided on an extended portion of the rolled lithium ribbon L so as to prevent the lithium ribbon L from sticking to the roller, thereby improving the production safety.

While the present application has been described with reference to the preferred embodiments, various modifications can be made, and equivalents can be provided to substitute for the components thereof without departing from the scope of the present application. In particular, the technical features mentioned in the embodiments can be combined in any manner, provided that there is no structural conflict. The present application is not limited to the specific embodiments disclosed herein but includes all the technical solutions that fall within the scope of the claims.

The invention claimed is:

1. A prelithiation device for bonding a lithium ribbon to a substrate, the prelithiation device comprising:

a bonding structure comprising a first roller, a second roller and a third roller, which are sequentially disposed adjacent to each other, the first roller and the second roller being used to roll the lithium ribbon, with the rolled lithium ribbon adhering to the second roller, and the second roller and the third roller being used to bond the lithium ribbon adhering to the second roller to the substrate, the lithium ribbon comprising two first surfaces opposite each other in a width direction of the lithium ribbon and a second surface facing the second roller; and a coater disposed upstream of the bonding structure in a running direction of the lithium ribbon to simultaneously coat the second surface and at least one of the first surfaces with a release agent.

2. The prelithiation device according to claim 1, wherein the coater comprises a coating roller, with a roller face of the coating roller being provided with a recess for accommodating the lithium ribbon, the recess being configured to simultaneously coat the second surface and at least one of the first surfaces with the release agent.

3. The prelithiation device according to claim 2, wherein the recess is an annular recess disposed around the axis of the coating roller.

4. The prelithiation device according to claim 2, wherein the recess comprises a bottom face and two first side faces opposite each other in an axial direction of the coating roller, the bottom face being configured to coat the second surface with the release agent, and the two first side faces being configured to coat the two first surfaces with the release agent.

5. The prelithiation device according to claim 4, wherein an included angle is formed between each of the first side faces and the bottom face, and the included angle is an obtuse angle.

6. The prelithiation device according to claim 2, wherein the coater further comprises a fixed roller, at least a part of the fixed roller being inserted in the recess and forming a gap with the recess, and the fixed roller being used to control the thickness of the release agent adhering to the coating roller.

7. The prelithiation device according to claim 6, wherein a roller face of the fixed roller is provided with a boss that is inserted in the recess and forms a gap with the recess.

8. The prelithiation device according to claim 7, wherein the boss is an annular boss disposed around the axis of the fixed roller.

9. The prelithiation device according to claim 8, wherein a notch is formed in the boss to control the thickness of the release agent on the coating roller.

10. The prelithiation device according to claim 6, wherein the fixed roller is located on the side of the coating roller that is away from the lithium ribbon.

11. The prelithiation device according to claim 6, wherein the coater further comprises:

a release agent squeezing structure for squeezing the release agent to a position between the coating roller and the fixed roller.

12. The prelithiation device according to claim 2, wherein the coater further comprises:

a support roller, the lithium ribbon passing between the support roller and the coating roller.

13. A prelithiation method for bonding a lithium ribbon to a substrate, the prelithiation method comprising:

feeding the lithium ribbon between a first roller and a second roller to roll the lithium ribbon by means of the first roller and the second roller, with the rolled lithium ribbon adhering to the second roller, and the lithium ribbon comprising two first surfaces opposite each other in a width direction of the lithium ribbon and a second surface facing the second roller;

feeding the substrate between the second roller and a third roller to bond the lithium ribbon adhering to the second roller to the substrate by means of the second roller and the third roller; and coating the second surface and at least one of the first surfaces with a release agent, by means of a coater, in a running direction of the lithium ribbon and upstream of the first roller and the second roller.

* * * * *